Aug. 31, 1954  R. H. GODDARD  2,687,646
APPARATUS FOR MEASURING THE RATE OF FLOW IN PIPES
Filed Feb. 23, 1952  2 Sheets-Sheet 1
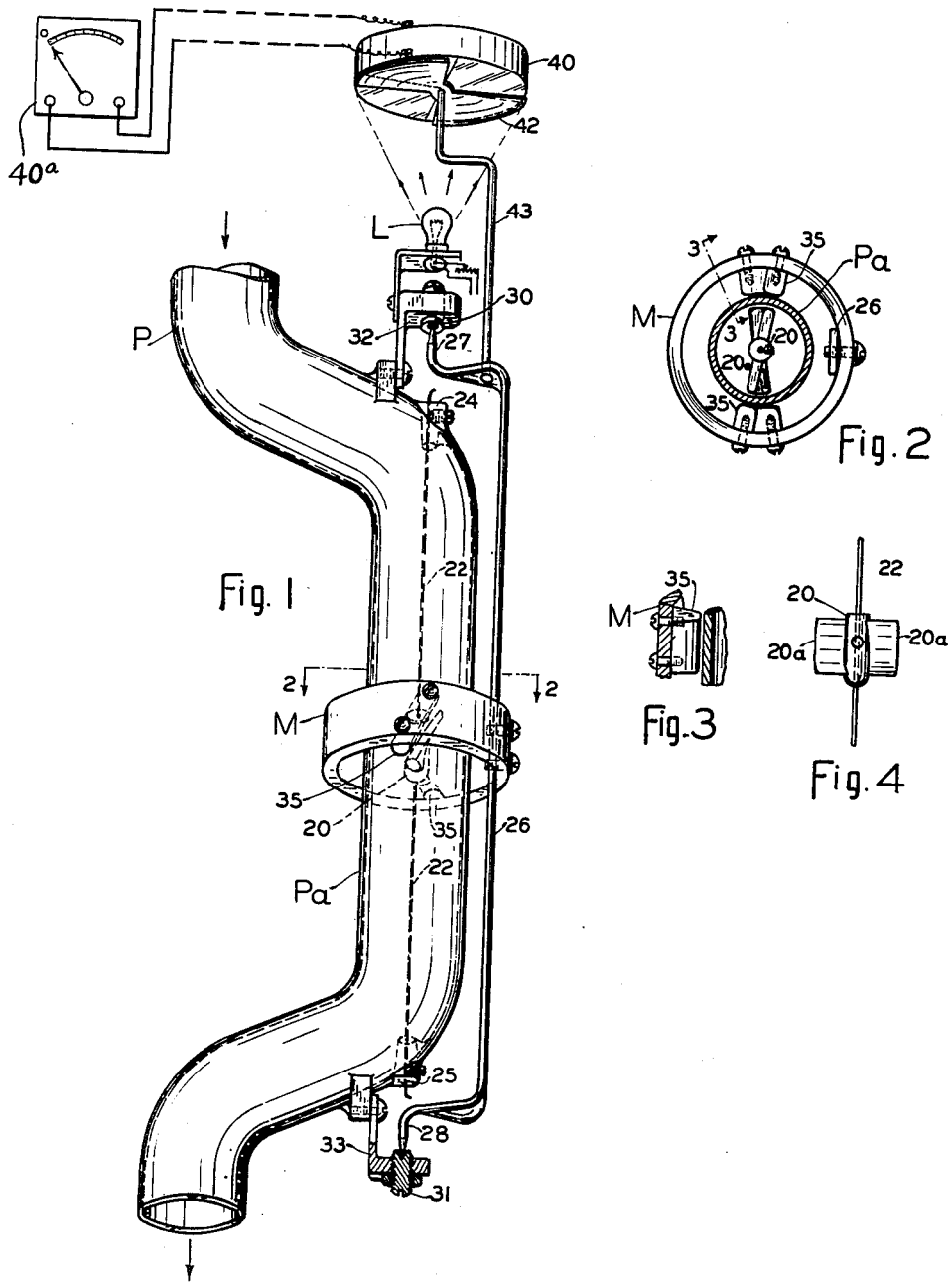
INVENTOR.
ROBERT H. GODDARD, DEC'D.
ESTHER C. GODDARD, EXECUTRIX.
BY
Chas. T. Hawley
ATT'Y.

Aug. 31, 1954 R. H. GODDARD 2,687,646
APPARATUS FOR MEASURING THE RATE OF FLOW IN PIPES
Filed Feb. 23, 1952 2 Sheets-Sheet 2

INVENTOR.
ROBERT H. GODDARD, DEC'D.
ESTHER C. GODDARD, EXECUTRIX
BY
Chas. T. Hawley
ATTY.

Patented Aug. 31, 1954

2,687,646

UNITED STATES PATENT OFFICE 2,687,646

APPARATUS FOR MEASURING THE RATE OF FLOW IN PIPES

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application February 23, 1952, Serial No. 273,133

3 Claims. (Cl. 73—228)

This invention relates to measurement of the rate of liquid flow in pipes and has for its more particular object the provision of apparatus which will furnish a continuous indication of any and all changes which may occur in the rate of flow.

To the attainment of this general object, an important feature of the invention relates to the magnetic coaction between a rotator movably mounted within a pipe and a magnetized ring mounted for angular displacement about the longitudinal axis of the pipe and in the locus of said rotator.

Provision is also made for visual indication of such angular displacement, and in a preferred form the indication may be photo-electric.

The invention further relates to arrangements and combinations of parts which will be hereinafter described and more particularly set forth in the appended claims.

Preferred forms of the invention are shown in the drawings, in which

Fig. 1 is a side elevation, partly in perspective and showing a preferred form of flow-measuring apparatus;

Fig. 2 is a sectional plan view, taken along the line 2—2 in Fig. 1;

Fig. 3 is a sectional elevation of a magnet ring, taken along the line 3—3 in Fig. 2;

Fig. 4 is a side elevation of a rotator;

Figure 5:
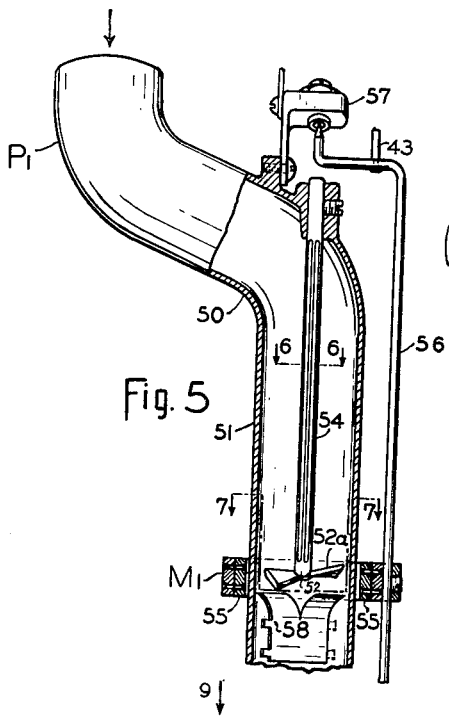
Fig. 5 is a sectional side elevation of a modified form of flow-measuring apparatus.
Figure 6:
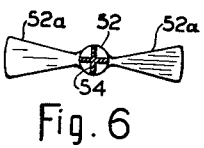
Figure 7:
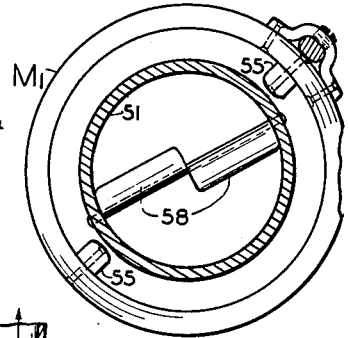
Figure 8:
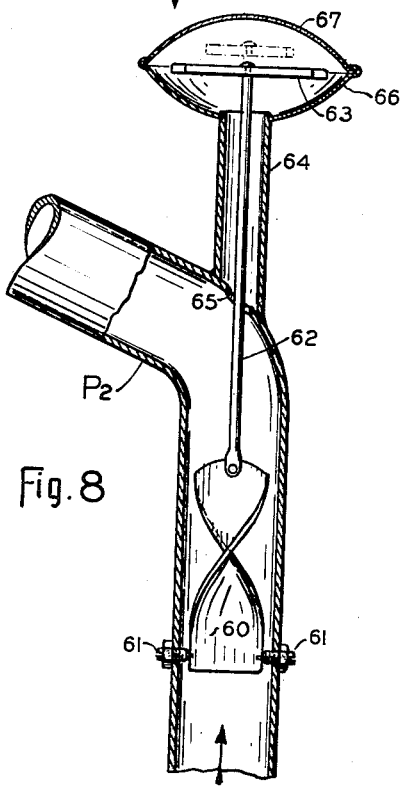
Figure 9:
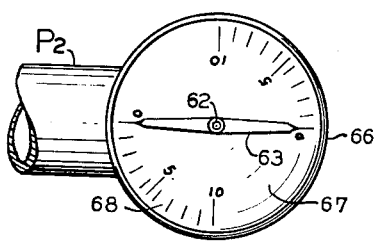

Figs. 6 and 7 are sectional plan views, taken along the lines 6—6 and 7—7 in Fig. 5 respectively;

Fig. 8 is a sectional side elevation of a further modified form of flow-measuring apparatus;

Fig. 9 is a plan view, looking in the direction of the arrow 9 in Fig. 8; and

Figure 10:
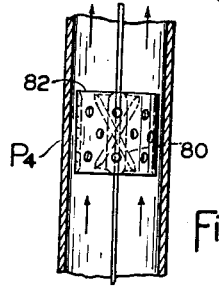

Fig. 10 is a sectional elevation showing a modified rotator.

Referring to Figs. 1 to 4, apparatus is shown for indicating downward liquid flow in a pipe P, which flow is operative on a rotator 20 mounted on a fine spring wire 22. The upper end of the wire 22 is secured in a bracket 24, and the lower end of the wire 22 is secured in a bracket 25.

The bracket 24 and bracket 25 are mounted on reversed curved portions of the pipe P, so that the wire 22 is axially centered in the straight middle portion Pa of the pipe P.

A permanent-magnet ring M loosely surrounds the pipe portion Pa and is supported on an upright flat rod 26 having offset end pivot portions 27 and 28 rotatably mounted in bearing blocks 30 and 31 which are secured in brackets 32 and 33 carried by the pipe P. The bearing blocks 30 and 31 are positioned concentric with the straight portion Pa of the pipe P, and accordingly the magnet ring M is also concentric with the pipe portion Pa and the rotator 20. The rotator 20 is made of soft iron or other magnetizable material, and the ring M is a permanent magnet and has opposite pole pieces 35 which clear the pipe portion Pa. The arms 20a of the rotator 20 are slightly curved or helically twisted as shown in Fig. 2, and the pole pieces 35 are similarly curved.

With the construction thus far described, it will be evident that the rotator 20 will be angularly displaced by the action of a flowing liquid on the obliquely disposed blades 20a. This displacement will angularly distort the spring suspension wire 22 and will be proportional to the rate of flow of the liquid. As the rotator 20 is displaced, the pivotally-mounted permanent-magnet ring M will be correspondingly displaced, as the magnet will tend to position itself so that the pole pieces 35 are directly in line with the rotator blades 20a, as shown in Fig. 2. If the rate of flow of liquid decreases, the spring wire 22 acts to move the rotator 20 in the reverse direction and toward its original position.

The angular displacement of the magnet ring M may be observed directly, and provision has also been made for indicating the displacement of the magnet ring by photo-electric means.

For this purpose, a photo-electric cell 40 is mounted above the apparatus and concentric with the pipe portion Pa and the magnet ring M. The cell 40 is provided with alternate clear and black quadrants on its under side as indicated in the drawing, and a two-quadrant interceptor 42 is mounted on a bracket 43 carried by the magnet-supporting rod 26. This positions the interceptor concentric with the cell 40.

A light L is mounted below the cell 40 and the interceptor 42, and preferably also in concentric position. The light L may be supported from the bearing bracket 32 previously described.

With the photo-electric cell 40 and interceptor 42 mounted as above described, a greater or less amount of light will be transmitted to the cell 40 in accordance with the angular displacement of the quadrants of the interceptor 42.

Simple and reliable apparatus is thus provided by which the rate of flow of liquid through the pipe P may be directly indicated by the position of the magnet ring M, or may be indicated at any desired distant point by the operation of the photo-electric cell 40 and by the use therewith of any usual indicating instrument 40a.

Referring to Figs. 5, 6 and 7, a modified construction is shown in which a pipe P' has an offset bent portion 50 and a succeeding straight portion 51. A second or return offset is provided but is not shown. A rotator 52 has inclined or twisted blades 52a and is mounted at the lower end of a supporting rod 54 formed of thin resilient metal. The rod 54 preferably has the cross-shaped section shown in Fig. 6. Such a section has sufficient stiffness against lateral displacement so that the rotator 52 will be axially centered in the pipe portion 51 without the necessity for a lower bearing.

A permanent-magnet ring M' is provided with pole pieces 55 and is mounted on a supporting rod 56 pivoted in an upper bracket 57 and in a lower bracket which is not shown but which corresponds to the bracket 33 in Fig. 1.

The indication of the displacement of the rotator 52 may be read directly from the angular position of the magnet ring M', or may be shown photo-electrically as previously described in connection with Fig. 1.

Curved vanes 58 may be mounted in the pipe portion 51 below the rotator 52 to straighten out the flow of the liquid after it passes the rotator.

A third form of the invention is shown in Figs. 8 and 9, and in this form, the invention may be applied at any usual elbow in a pipe P2. In this construction, a single twisted vane or blade 60 is secured in axial position in the pipe P2 by supporting screws 61, and extends freely upward in an axial position within the pipe.

The upper end of the blade 60 is connected by a rod 62 to a cross bar or indicator 63. The rod 62 is concentric with a tube 64 having a vent or opening 65 into the pipe P2 and having a casing 66 mounted at its upper end and provided with a transparent and preferably convex cover portion 67.

In this form of the invention, it is assumed that the flow of liquid is upward in the pipe P2, and such flow obviously tends to straighten or flatten the helical blade 60, thus causing the indicator 63 to be displaced angularly. Such angular displacement may be conveniently read on a scale 68 provided on the transparent cover 67.

It will be noted that friction is entirely avoided in this construction, as the pipe 64 and the casing 66 contain liquid at the same pressure as the pipe P2, so that no packing is required for the rod 62.

A modified form of rotator is shown in Fig. 10, in which the rotator blades 80 are supported as indicated in Figs. 1 and 4 but are also provided with an open-end perforated cylindrical casing 82. The outward radial pressure of the liquid displaced by the blades 80 tends to center the casing 82 in the pipe P4 and to thus prevent transverse displacement of the rotator and the resultant friction.

In all forms of the invention, extremely simple and reliable mechanism provides continuous indication of the rate of flow and of variations therein.

Having thus described the invention and the advantages thereof, it will be understood that the invention is not to be limited to the details herein disclosed, otherwise than as set forth in the claims, but what is claimed is:

1. In apparatus for measuring the rate of flow of a liquid in a pipe, in combination, an angularly-displaceable member axially mounted in said pipe and having a helical portion engaged by the flowing liquid, means supporting said member and firmly secured at least at one end to the inflow portion of said pipe to yieldingly resist the angularly displacement of said member by said liquid, an annular member mounted concentric with said pipe and loosely surrounding said angularly-displaceable member and pipe and coacting magnetically with said displaceable member, pivotal supporting means for said annular member, and photo-electric means to give a proportionate indication of the angular displacement of said annular member, and comprising a light source, a photo-electric cell, an interceptor interposed between said light source and said cell, and means to move said interceptor in fixed relation to the angular displacement of said annular member which is magnetically occasioned by angular displacement of said angularly-displaceable member.

2. Flow-measuring apparatus as set forth in claim 1, in which the angularly-displaceable member is of magnetizable material, and in which the annular member comprises a permanent magnet having inwardly-directed pole pieces which co-act with said displaceable member.

3. Flow-measuring apparatus as set forth in claim 1, in which the means supporting said member comprise a resilient supporting member of non-circular cross-section having one end affixed to said pipe and the other end affixed to said angularly displaceable member.

References Cited in the file of this patent

UNITED STATES PATENTS

| Number | Name | Date |
|---|---|---|
| 1,665,141 | Mayer | Apr. 3, 1928 |
| 2,316,255 | Knobel et al. | Apr. 13, 1943 |
| 2,422,762 | Williams | June 24, 1947 |
| 2,483,190 | Evans | Sept. 27, 1949 |

FOREIGN PATENTS

| Number | Country | Date |
|---|---|---|
| 399,405 | Germany | Aug. 4, 1924 |